United States Patent [19]
Mack et al.

[11] Patent Number: 5,470,046
[45] Date of Patent: Nov. 28, 1995

[54] GATE VALVE STRUCTURE

[75] Inventors: Donald F. Mack, Lovington; Timothy M. Logman, Monticello; Gary L. Bouc, Decatur, all of Ill.; Larry W. Greenlee, Chattanooga, Tenn.

[73] Assignee: Mueller Company, Decatur, Ill.

[21] Appl. No.: 997,702

[22] Filed: Jan. 5, 1993

[51] Int. Cl.⁶ .................................................. F16K 3/314
[52] U.S. Cl. ........................................ 251/329; 251/267
[58] Field of Search ................................. 251/267, 326, 251/329

[56] References Cited

U.S. PATENT DOCUMENTS

| | | |
|---|---|---|
| 3,170,226 | 2/1965 | Larry . |
| 3,633,873 | 1/1972 | Leopold, Jr. et al. . |
| 3,662,778 | 5/1972 | Leopold, Jr. et al. . |
| 3,763,880 | 10/1973 | Leopold, Jr. et al. . |
| 3,774,647 | 11/1973 | Saha et al. . |
| 3,809,363 | 5/1974 | Rhodes . |
| 3,957,245 | 5/1976 | Daghe . |
| 3,963,214 | 6/1976 | Hackman et al. . |
| 4,138,091 | 2/1979 | McGee ........................... 251/267 |
| 4,162,058 | 7/1979 | Ellis . |
| 4,223,868 | 9/1980 | Humes et al. . |
| 4,303,223 | 12/1981 | Whisenhunt et al. . |
| 4,431,163 | 2/1984 | Barbe . |
| 4,607,821 | 8/1986 | David ............................. 251/329 |
| 4,699,359 | 10/1987 | David ............................. 251/329 |
| 4,964,613 | 10/1990 | Logman . |
| 4,968,002 | 11/1990 | Gibson et al. ................ 251/329 X |

Primary Examiner—John C. Fox
Attorney, Agent, or Firm—Cushman Darby & Cushman

[57] ABSTRACT

A resilient seat gate valve is provided with a housing having an opening for receiving the operating stem for the valve and a cover with a seal for the cover to the housing opening comprising a step peripheral surface and an angled surface located interiorly of the valve housing opening; the cover is provided with a locking mechanism for drawing the opening peripheral surface against the angled surface of the housing lip to compress the seal carried by the peripheral surface of the cover and to effect the attachment of the cover in place without bolts or screws; the valve disc is provided with side edges covered by an elastomer and protected with a fully enclosing, replaceable cap to prolong the life of the valve disc by protecting the elastomer coating from abrasion; a dumbbell dirt and fluid pressure seal O-ring arrangement is provided between the cover and lip of the housing to facilitate insertion and positioning of the seal during installation of the cover.

25 Claims, 10 Drawing Sheets

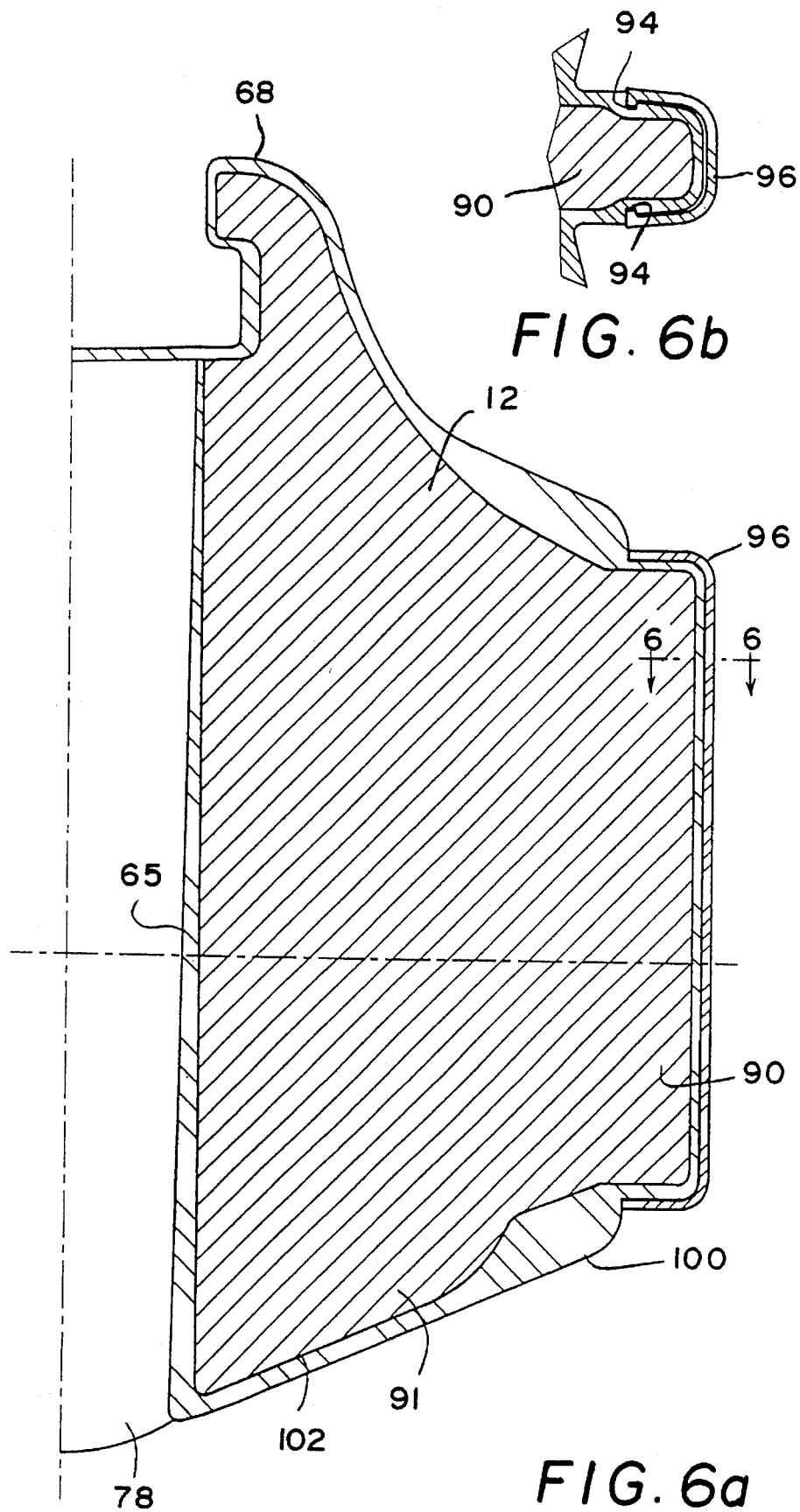

GATE VALVE STRUCTURE

BACKGROUND OF THE INVENTION

1. Field of the Invention

The present invention relates to gate valve structures used primarily in large mains carrying fluid under high pressure such as water mains in city and country water distribution systems. It will be apparent, however, to those skilled in this art, that while the design considerations giving rise to the present invention are directly primarily to problems resulting from high pressure water distribution systems, the valve of the present invention can be successfully utilized in a wide range of water main sizes and in other fluid distribution systems such as fire protection and waste water systems as well as chemical, steam, gas, oil or the like systems, wherein the fluid is under varying pressures from low to high pressure and may contain corrosive chemicals.

2. Description of the Prior Art

The prior art has proposed a wide variety of structures for gate valves used in water distribution systems for the purpose of expanding the utility of the valve structure as well as prolonging its useful life before replacement or significant repair is required. To this end, structures such as are disclosed in U.S. Pat. No. 3,662,778, granted May 16, 1972, have been proposed where a portion of the valve plate and the guides in the housing for the valve plate have been coated to reduce wear on the housing and valve plate. Similarly, in prior U.S. Pat. Nos. 3,763,880 of Oct. 9, 1973 and 3,633,873 of Jan. 11, 1972, fully coated valve members have been proposed of specific structure to reduce the corrosive influence of the fluids being handled on the valve plate and its sealing surfaces. Another problem that the prior art has attempted to solve is that of the physical integrity of the housing for the gate valve since premature leakage of the housing can result in corresponding premature failure of the valve function itself. To this end, the elimination of securing members such as bolts, rivets and the like has been attempted, such as represented by U.S. Pat. No. 4,431,163 of Feb. 14, 1984.

SUMMARY OF THE INVENTION

The present invention provides a significantly less expensive solution to the problem of corrosion in fluid handling valves, such as those used in water main systems and yet provides a struture that is less expensive to manufacture and install, yet will provide substantially enhanced useable life over the structures that have previously been developed in this field. In a specific embodiment, the present invention relates to the provision of a non-rising stem gate valve that includes a fully epoxy coated housing body together with a protective coating of polyurthane for the epoxy material to guard against premature failure of the coating and eventually of the valve. Further, the valve housing is of the boltless type, that is, one where the cover is securely held in place by an external, removable retainer ring which cooperates with an internal peripheral portion of the cover. This is achieved by a unique sealing structure which prevents premature deterioration of the sealing member for the housing opening and yet is so structured as to assure a leak proof closing of the housing's opening.

With this arrangement, a secure, yet less expensive, and more easily assembled gate valve structure will be provided where the disadvantages inherent in an assembly utilizing nuts, bolts or similar fastening devices is avoided.

In another aspect, the present invention provides an improved valve member operable by the stationary threaded stem to open and close the flow passage through the valve housing. Specifically, the seating portion of the plate valve member is provided with an elastomeric coating which will serve to prevent over torquing injury to the valve member during the life of the valve itself.

The foregoing and other advantages will become apparent as consideration is given to the following detail description taken in conjunction with the accompanying drawings, in which:

BRIEF DESCRIPTION OF THE DRAWINGS

FIGS. 6a and 6b are, respectively, sectional views in elevation of a portion of the valve plate of the present invention, while FIG. 6b is a view along lines 6—6 of FIG. 6a;

DETAILED DESCRIPTION OF THE INVENTION

Figure 2:
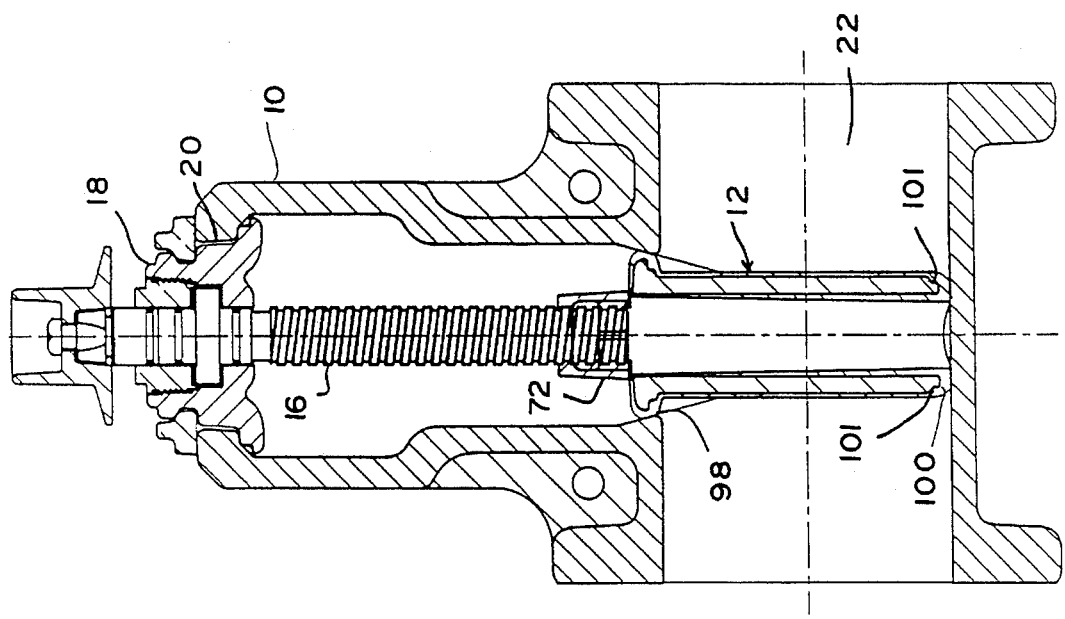
FIG. 2 is a view along lines 2—2 of FIG. 1.
Figure 1:
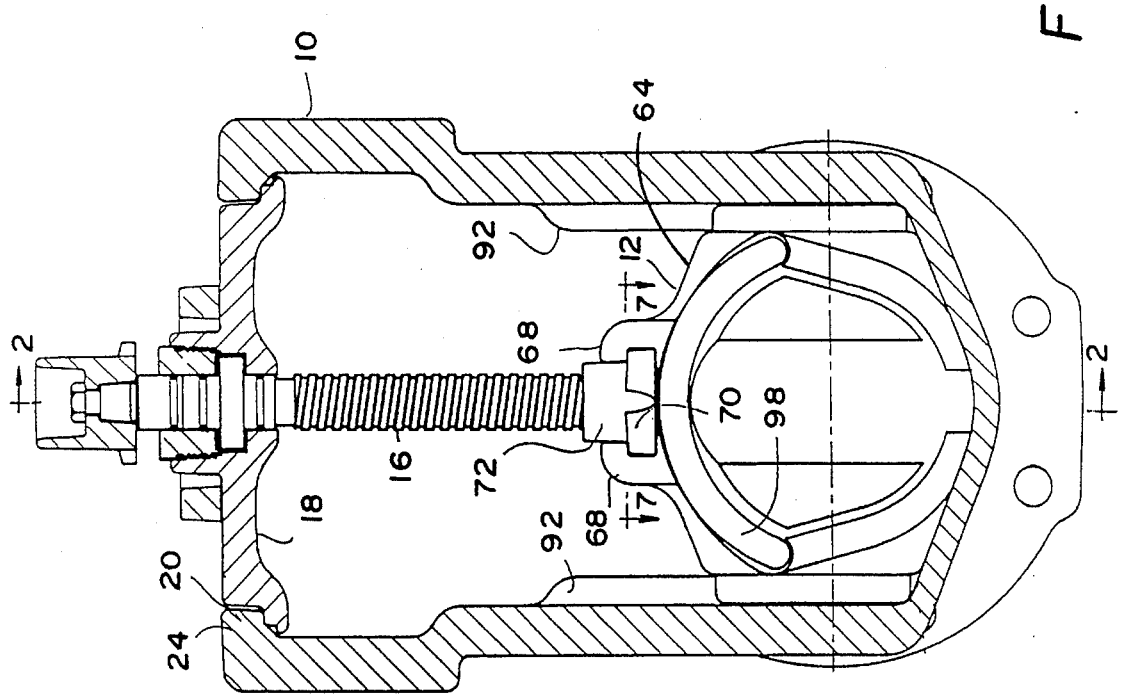
FIG. 1 is a front view in elevation, partly in section, of the valve of the present invention.

Referring now to the drawings wherein like numerals designate corresponding parts throughout the several views, there is shown in FIGS. 1 and 2 a valve housing 10 according to the present invention which supports a valve member or plate 12 therein for movement along a normally vertical axis 14 effected by rotation of a valve stem 16 which is rotatably mounted in a cover 18. The cover 18 sealingly closes the opening 20 of housing 10. As shown in FIG. 2, the valve member 12 is fully inserted into the flow path 22 of the housing 10 and is located remote from the opening 20 at the upper end of the housing as shown in the drawings. In general, the flow path 22 will extend transverse to the longitudinal axis 14 of the housing 10, but it will be understood by those skilled in the art that to accommodate certain installations for customers, other angular orientations are within the scope of this invention.

Referring again to the drawings, and specifically FIGS. 1 and 2, it will be seen that the housing 10 has a lip 24 surrounding the longitudinal axis 14 and which is smoothly formed such as by casting and with a minimum or no machining. It will also be noted that there is no provision for bolts, screws or the like for fastening the cover 18 to the opening 20 of housing 10.

Figure 3:
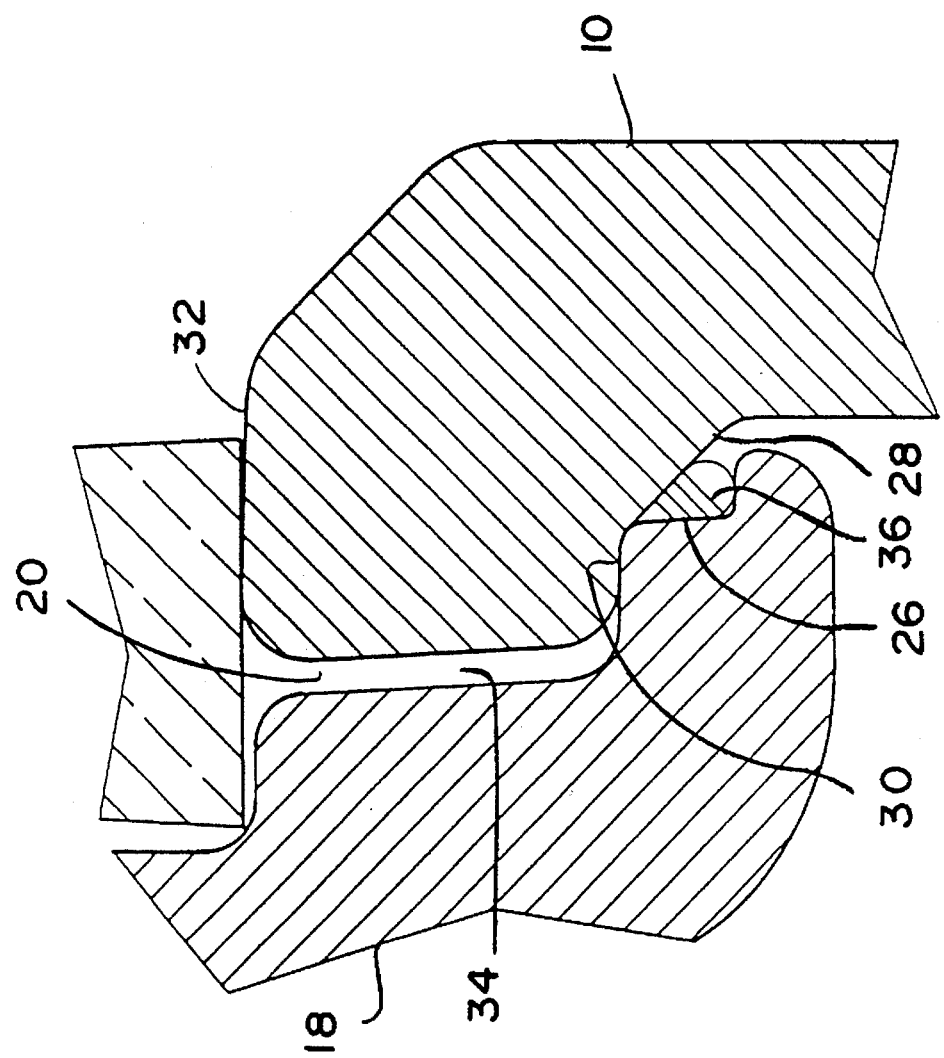
FIG. 3 is a detailed sectional view of the sealing arrangement for the valve of FIGS. 1 and 2.

With reference now to FIG. 3, there is shown an enlarged sectional detail of a peripheral portion of the cover 18. As shown, the cover 18 is provided with a first L shaped recess 26 about its lower most edge. Correspondingly, the inner edge of the lip 20 is provided with a peripheral flat surface 28 which extends at an acute angle of approximately 45° relative to the longitudinal axis 14 of the housing 10. From the uppermost edge of the angled surface 28, there extends a flat surface 30 substantially radially with respect to the longitudinal axis 14. Thereafter, the lip extends substantially vertically from surface 30 to the upper rim 32 of the lip 20. The vertical edge may have a small slope from the perpendicular from surface 30

Conventionally, the cover provided for such arrangements would provide identically mating or complementary surfaces to assure a close and tight fit. According to the present invention, however, this is avoided. Instead, the flat surface 30 extends radially with respect to the axis of the housing and therefore of the cover to an extent to provide a gap 34 between the facing surface of the cover 18 and that of the lip 20. With this arrangement, a user will have the option of locating an elastomeric O-ring type sealing member in the L-shaped peripheral recess 26, while the flat surface 30 will engage the underside of the lip 20 as described in more detail hereinafter. With this arrangement, the O-ring 36 disposed in the L-shaped peripheral recess 26 will be compressed against the angled surface 28 and the L-shaped recess walls to take the shape illustrated in FIG. 3. This will provide a leak-tight fluid seal for the outer periphery of the cover and the lip surface 28. The life of the seal 36 will be greatly prolonged over that of previous arrangements of this type since the fluid pressure that may accumulate in the housing 10 beneath the cover 18 will be unable to dislodge the O-ring 36 by virtue of the physical contact between the underside of the lip 20 and the flat peripheral surface 30 of the cover 18.

Figure 4:
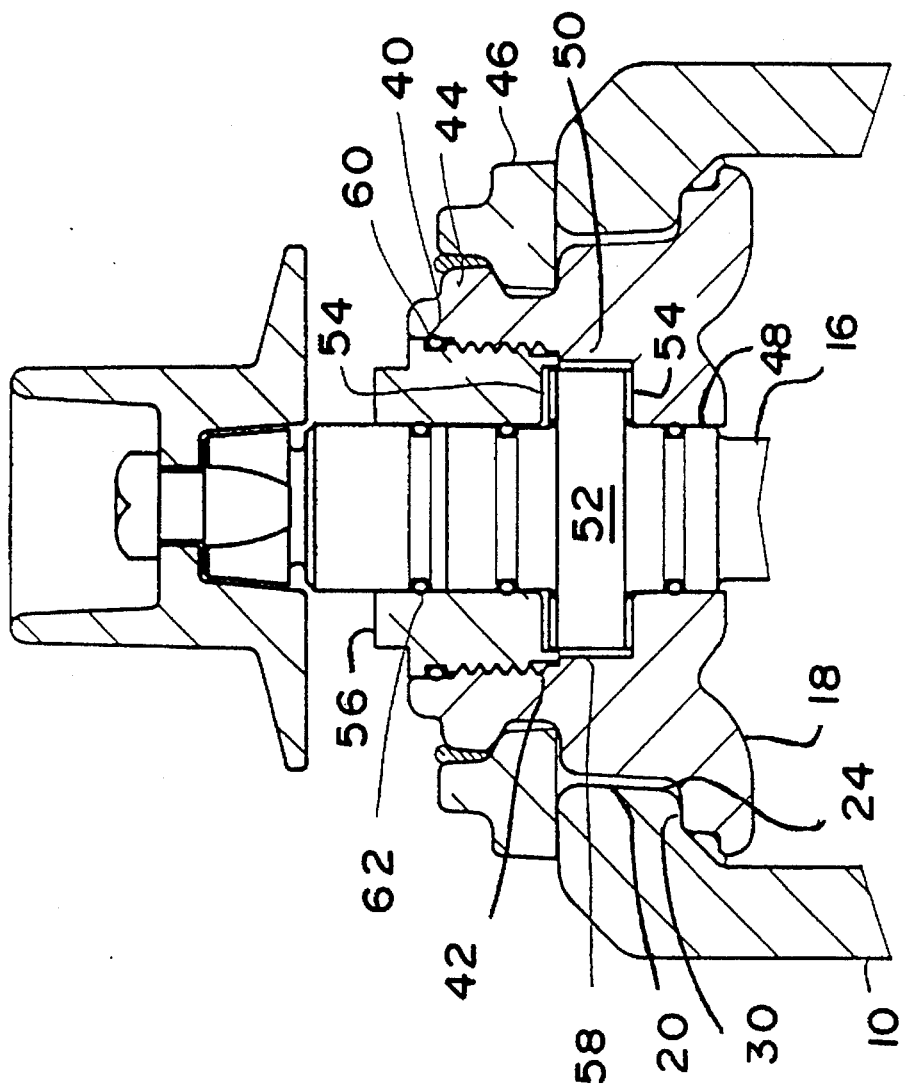
FIG. 4 is an enlarged sectional view of the upper end of the valve housing and closing devices of the present invention.

In FIG. 4, there is shown the cover 18 in its installed position closing the opening 24 of the housing 10. The cover 18 is provided with an upstanding annular shoulder 40 which defines a cavity 42, the upper interior rim of which is smooth and lies adjacent to a threaded portion extending over the remainder of the surface of the interior wall of the cavity 42.

At approximately the height of the threads on the interior of the shoulder 40, there are provided externally of the shoulder, diametrically opposed radially projecting lugs, one of which is indicated at 44. The lugs cooperate with corresponding lugs provided on a locking or retainer ring 46, which will be described below.

The uppermost portion of a valve operating stem 16 is inserted through an opening 48, provided in the cover 18. Between the opening 48, which may be a counter bore, there is provided a bore 50 of greater diameter than the counter bore 48. The bore 50 lies immediately beneath the cavity 42. The valve operating stem 16 is provided with a collar 52, which fits loosely in the bore 50 and which may be provided with upper and lower friction washers 54. To retain the valve stem in the assembled position, a retainer bushing 56 is inserted over the free end of the stem 16 and threaded into the cavity 42 to the position shown. The lower most portion of the bushing 56 is provided with depending fingers as at 58, which engage a shoulder provided at the base of the threads of the shoulder portion. This will prevent over tightening of the bushing 56 in the cavity 40. About the upper rim of the bushing 56 on its exterior is provided a groove for receiving an O-ring sealing member 60. Similarly, the bushing 56 is provided with a through bore axially aligned with the bore 50 and counter bore 48 to thereby accurately locate the valve stem relative to the valve member located there below as shown in FIGS. 1 and 2. The periphery of the uppermost portion of the valve stem 16 is provided with the conventional sealing members such as the O-rings 62 fitted into mating grooves, as shown.

Figure 5B:
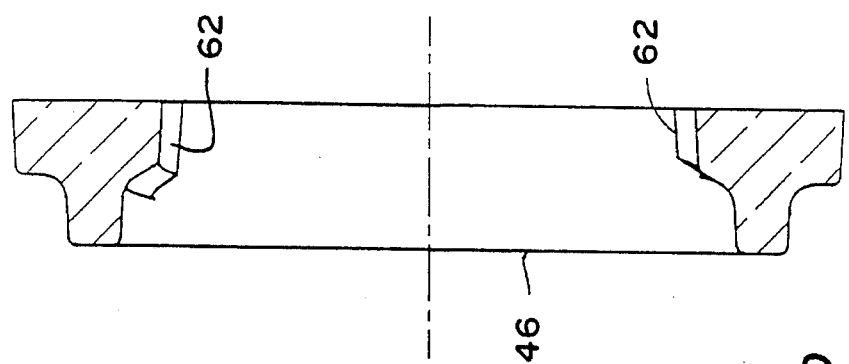
FIGS. 5a and 5b are axial and sectional views, respectively, of the annular retaining ring.
Figure 5A:
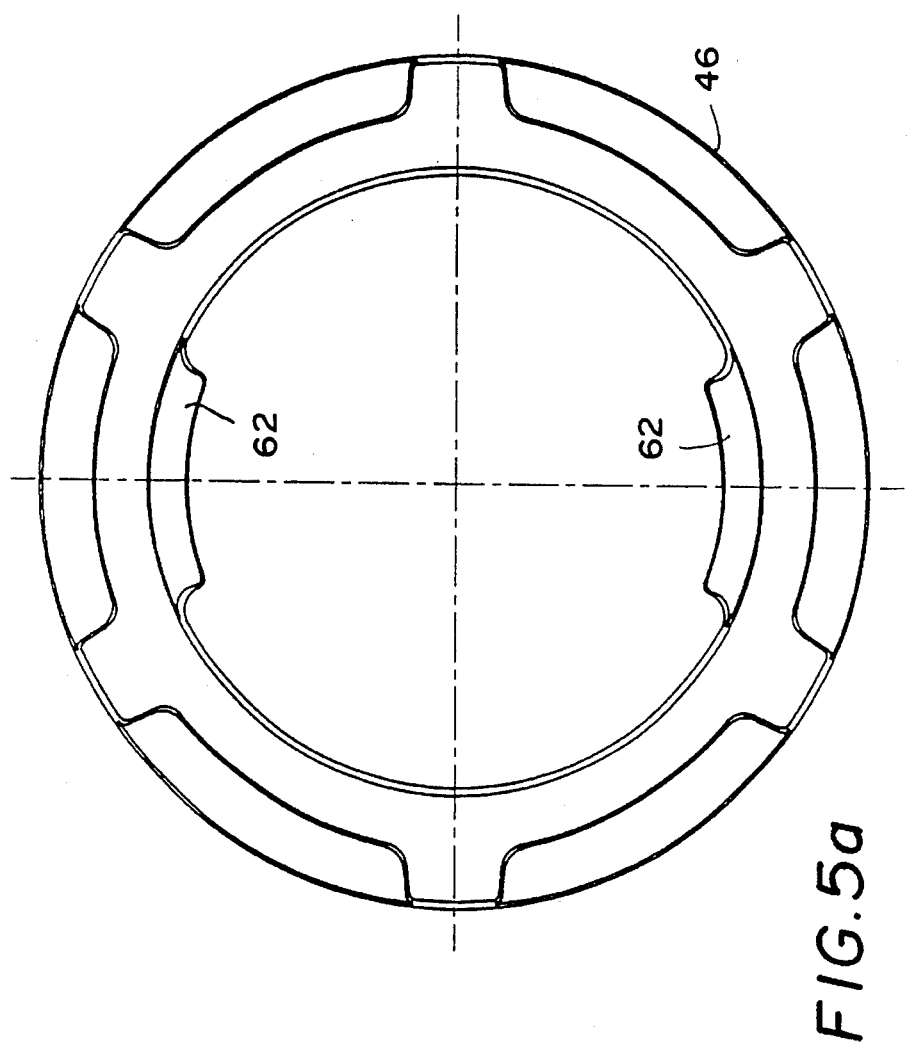

Referring to the lug members 44 provided on the external side wall of the shoulder 40, it will be seen that the undersides of the lug members slop upwardly relatively to the longitudinal axis of the housing 14. With reference to FIGS. 5a and 5b, there is shown a plan and sectional view of the retaining ring 46 where the diametrically located retaining lugs 62 are correspondingly sloped as shown in FIG. 5b to facilitate interengagement between the corresponding lugs 44 on the shoulder portion 40. With this arrangement, it is a relatively easy matter to rotate the ring 46 to effect secure locking of the cover 18 in place resulting from the caming action afforded by the sloping interengagement of the surfaces of the lug members.

Referring again to FIGS. 1 and 2, the valve plate 12 of the present invention has an upper side 4 from which a pair of retaining arms 68 extend to engage a flange 70 provided on a disc nut 72. The entire surface of the integrally cast steel valve plate is covered with a compressible elastomer such as buna-n nitrile or rubber. The coating has the effect of greatly extending the life of the valve plate by preventing corrosion and to insure excellent sealing of the flow passage.

Figure 7:
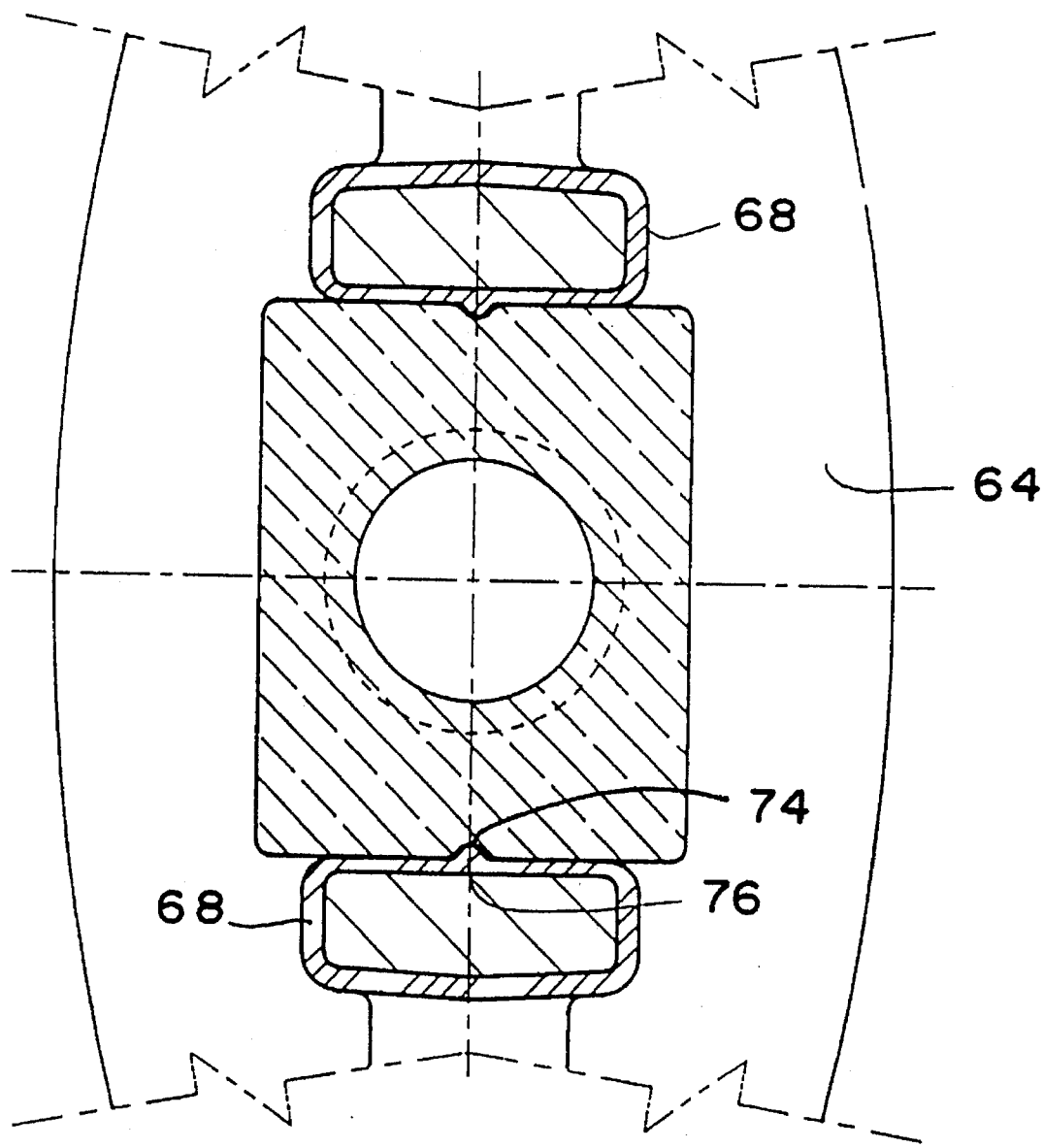
FIG. 7 is a view taken along line 7—7 of FIG. 1.
Figure 8:
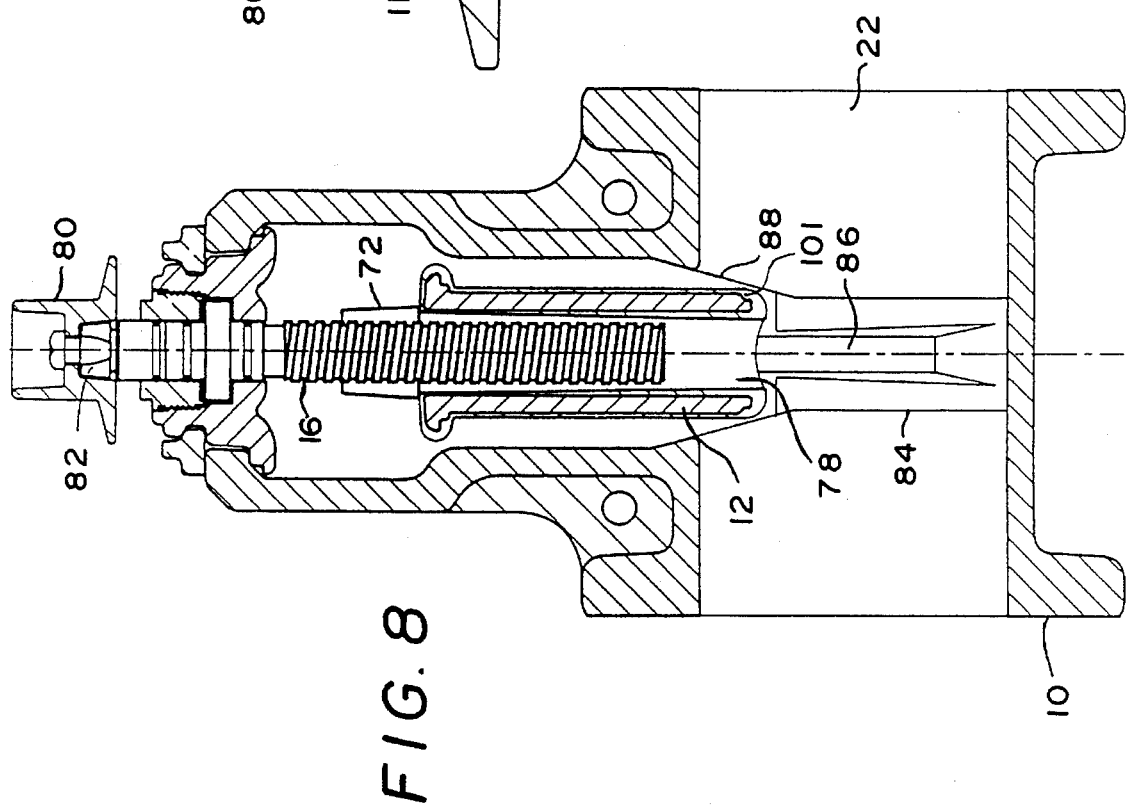
FIG. 8 is a view similar to FIG. 2 but showing the valve plate in its retracted position to reveal a portion of the valve seat.
Figure 13A:
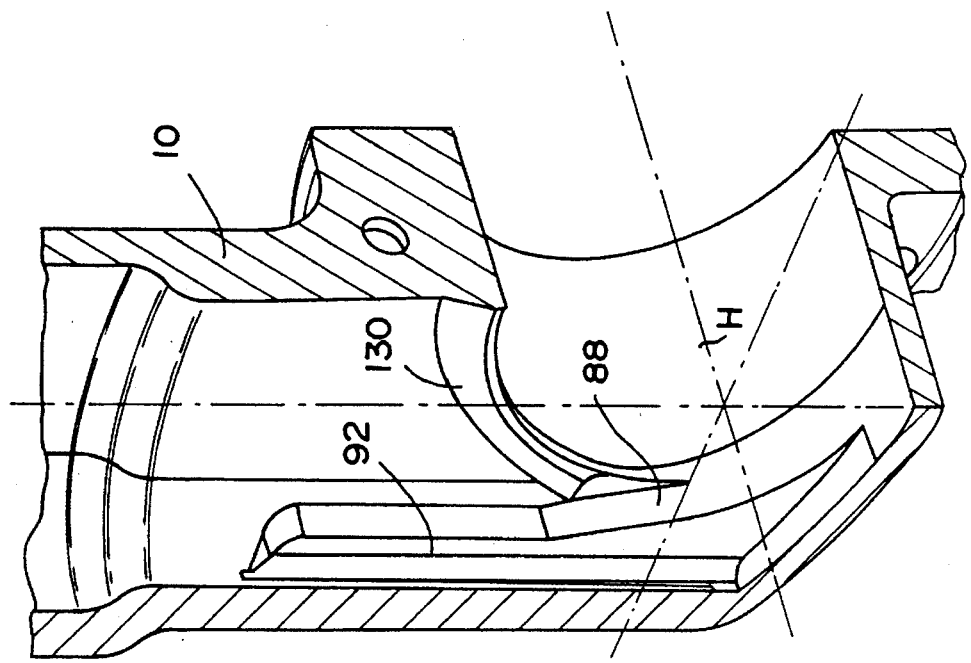
FIGS. 13a and 13b are, respectively, sectional perspective views of the interior of the valve housing showing a portion of a prior art guide groove and that of the present invention.
Figure 13B:
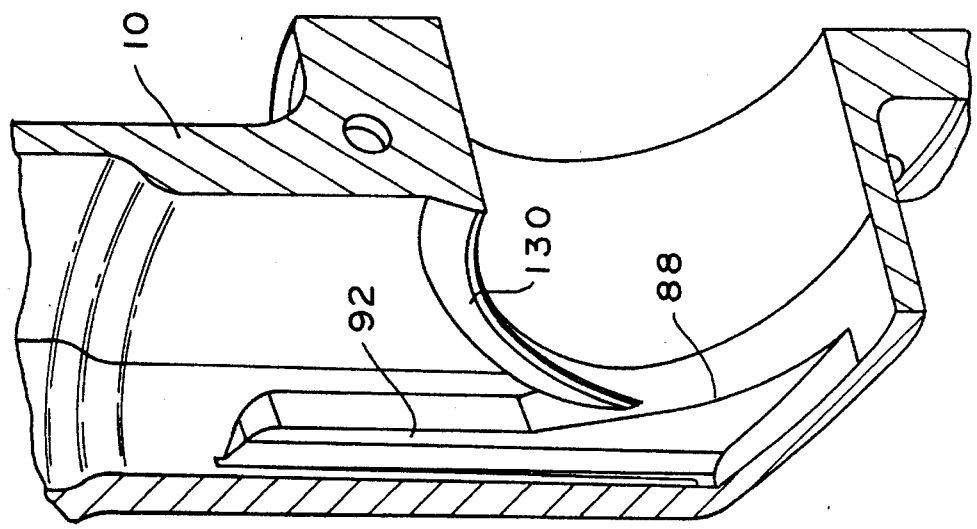

As shown in FIG. 7, the disc nut 72 is formed on opposite sides with parallel extending grooves 74 which extend from the bottom surface of the disc nut 72 at least up to the height of the arms 68. Preferably, the disc nut is cast in brass. Where the arms 68 are covered by the protective coating as described above, the coating layer is formed or molded to provide mating tongues 76 which are coextensive in length with the grooves 74 of the disc nut 72. With this arrangement, the disc nut 72, when inserted between the arm 68 will be held in place against rotation relative to the valve plate 12 with which the arms 68 are integrally formed. This is particularly useful when the valve is installed with its axis extending horizontally as the disc nut 72 will be retained when the stem is withdrawn. It will be evident that the elastomer coating should have sufficient thickness to provide only a selected degree of resiliency so that the interengagement of the tongues 76 and respective groove 74 will restrict relative movement after installation of the disc nut 72. With reference to FIG. 8, the valve plate 12 is shown in a position as it is moved towards a retracted condition relative to the flow path 22 of the housing. As in previous gate valve structures, the valve plate is provided with a hollow tubular channel 78 extending entirely therethrough to permit the channel 78 to receive the operating stem 16 upon rotation of the stem effected by rotation of the operating nut 80 secured to the exposed end 82 of the stem 16. The flow path 22 of the housing 10 is provided on opposite sides with wall sections 84 defining guide grooves 86 which are located on opposite sides of the valve plate 12. From the direction of entry of the valve plate 12 into the flow path, the sides of each guide groove diverge outwardly at 88 to avoid frictional wear on the elastomer coating of the valve plate 12 and to allow for some deflection of the valve plate during its movement into the flow path. The guide grooves will assure proper positioning of the valve plate 12. Above the fully seated position of the valve plate 12 as shown in FIG. 1, the grooves are extended to define oppositely disposed guide tracks 92. It will be seen then that, for all positions of the plate 12, the grooves and tracks will guide the plate 12. As seen more clearly in the sectional perspective view of FIG. 13*a*, the arcuate seat rim 130 of the valve seat is set back a selected distance H from the center of the guide groove 88. The rim 130 engages the upper bead on the valve plate 12 to seal the upper portion of the flow passage. The site where the rim 130 intercepts the groove 88 has caused rapid wear and deterioration of the elastomer on the valve plates in the past where the rim was closely adjacent the groove 88 as shown in the prior art structure of FIG. 13*b*.

As shown in FIGS. 6*a* and 6*b*, the extreme side edges 90 of the valve plate are preferably formed with a pair of detent grooves 94 (FIG. 6B) which serve to anchor a protective shield member or cap 96 as shown in FIGS. 6A and 6B. The caps 96 serve two functions. In coating the valve plate 12 with the elastomer, locater pins are used during the coating process which leave recesses in the coating. The caps serve to cover these recesses and thus remove a potential site for deterioration of the protective elastomeric coating. The shield members 96 on the opposite edges will experience the frictional forces normally encountered in movement of the valve plate 12 between its retracted and operational positions and can be readily replaced when damage or wear is apparent, thereby avoiding or greatly postponing the necessity for repair or replacement of the valve plate 12 itself. The shield members 96 may be made of a flexible plastic material such as polytetrafluoroethylene or polyethylene or polypropylene, the characteristics of which compounds are particularly useful in this environment. By attaching the enlarged opposite ends of the shield or caps 96 in grooves that extend parallel to the direction of travel of the valve plate 12 in operation and thus transverse to the fluid flow, the forces that would tend to dislodge the shield caps 96 whatever the direction of flow through the passage 22 can be tolerated without risk of dislodging the caps 96. As shown in FIG. 6, the caps completely enclose the projecting ends 90 on each side of the valve plate 12. Thus, the guide grooves 92 on opposite sides of a portion of the path of travel of the valve plate 12 will also cooperate to retain the shield caps 96 in place during valve opening and closing operations.

It will be apparent that the valve plate 12 is symmetrical from one side to the other and is preferably formed with an arched elastomer bead 98 on the upper outer surfaces extending between the ends 90 of the valve plate 12 and similarly shaped lower edge sealing surfaces 100 which are formed utilizing using a conventional casting technique for the elastomeric compound. With these shapes, the valve plate will be provided with additional sealing material along is upper and lower edges for cooperating with the opposing surfaces of the housing 10 in use. Of particular importance is the provision of a relatively wide surface area 102 along the base 91 of the valve plate on opposite sides of the channel 78. In addition, along the lower edge of the cast portion of the valve plate 12, a step 101 is formed. This will prevent the plate's seal surfaces from being damaged by providing a relatively thin elastomeric or rubber coating along the lowermost edge which will withstand the closing force of the valve operating mechanism without over compressing the elastomer or rubber which will be deflected outwardly due to the provision of the steps 101 on each lower edge. With such a structure for the lower edge of the valve plate 12, damage to the elastomer from over torquing of valve plate 12 will be minimized, if not prevented. It will be noted in FIG. 6A that the hollow channel 78 is also fully coated with the elastomer 65 to maintain the integrity of the valve plate 12. With this type of protection, the valve will exhibit improved corrosion and abrasion resistance as well as electrically isolated from dissembled metals thereby further enhancing the life of the valve.

Figure 9B:
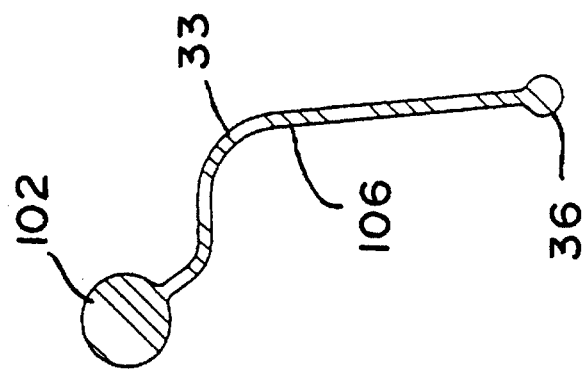
FIG. 9a is a view similar to FIG. 3 but showing another sealing member for the cover with FIG. 9b showing a sectional view of the sealing member in its uncompressed condition.
Figure 9A:
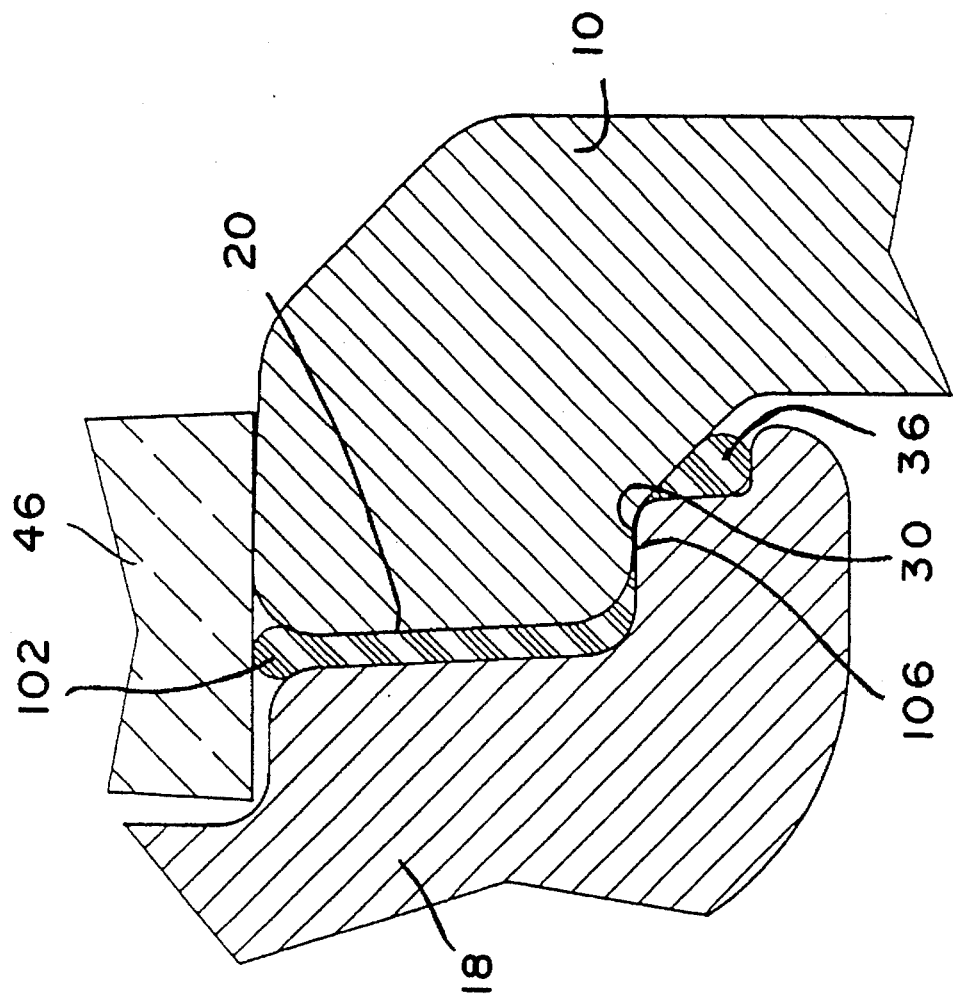

With reference to FIGS. 9*a* and 9*b*, there is shown the provision of a dirt seal 102 between the opposing faces of the lip 20 of the housing 10 and the cover 18. Preferably, an elastomer molded to occupy the gap between the opposing surfaces of the lip 20 and cover 18 is provided. It has been found that by installing such a dirt seal 102, positioning of the cover 18 in the opening defined by the lip 20 is greatly facilitated. Further, by locating the primary bearing point between the cover 18 and lip 20 interiorly of the outer edge of the lip and cover as along the surface portion 30 of the lip 20, the tendency of the seal 102 to be extruded by fluid under pressure is greatly minimized. It has been found that the use of a seal in the form of an O-ring, when uncompressed, is particularly useful in this application. In installing the O-ring, it has been found advantageous to attach the seal 102 to the fluid pressure seal 36 by a thin flat elastomeric section 33 (FIG. 9*b*) which may be formed to follow the contour of the L-shaped recess 26 bridging over into the gap 34. As shown in FIG. 9*a*, the two O-ring portions of the seal connected by the thin elastomer section 106 are shown in their fully compressed state. By using two O-rings connected as described above by the thin section 106, positioning and retention of the O-rings during installation is greatly facilitated. In addition, retention of the installed seals is greatly improved as a result of the compressive contact between the surface 30 and the opposing portion of the cover 18. Of particular importance is the fact that such a sealing arrangement will permit the manufacture of the housing and cover with raw casting tolerances thereby eliminating the significant cost which normally would be incurred where subsequent machining is required to finish these surfaces.

Figure 10:
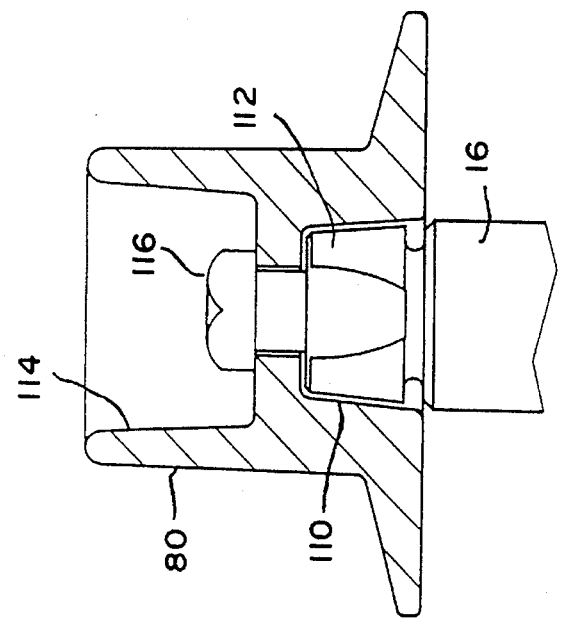
FIG. 10 is a detailed view of the operating wrench nut and its mounting on the exposed end of the valve operating stem.
Figure 11:
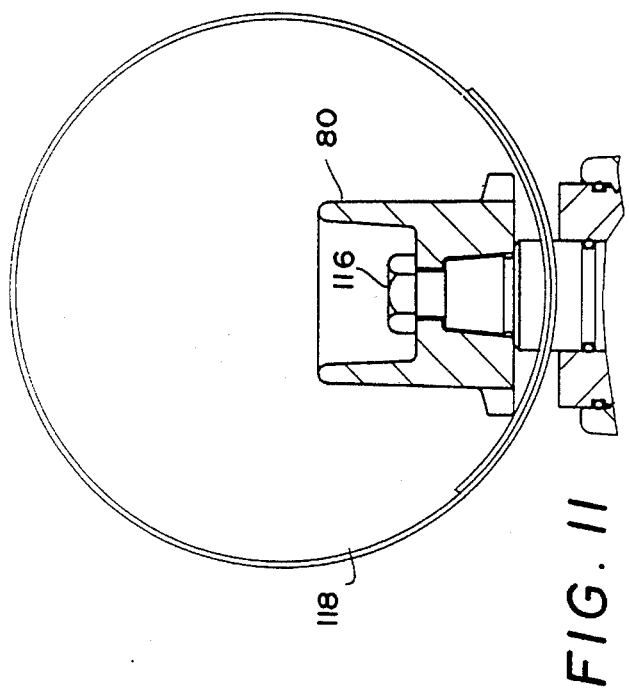
FIG. 11 is a view similar to FIG. 10 but showing the valve stem rotated 90° and showing the installation of a lifting strap.
Figure 12:
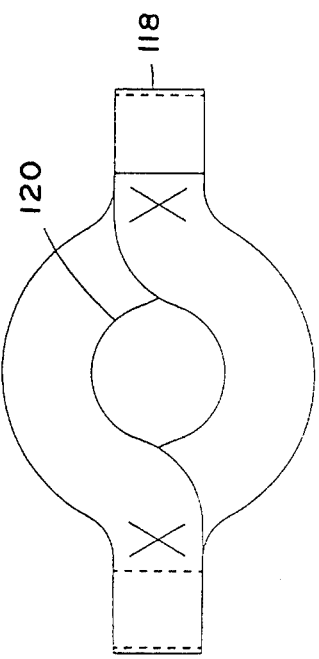
FIG. 12 is a bottom plan view of the lifting strap of FIG. 11.

Turning now to FIGS. 10–12, there is shown the preferred method of performing and attaching a wrench nut 80 to the upper end of the stem 16. To this end, the wrench nut 80 is provided with a cavity 110 shaped to conform closely to the slightly tapered knob 112 formed integrally with the stem 16. The wrench nut 80 is also provided with a cavity 114 for receiving a socket wrench. The base of the cavity 114 is provided with an aperture for receiving a threaded bolt 116 which is received in a threaded bore cast in the upper face of the knob 112. Before attaching the wrench nut 80 as illustrated, a lifting strap 118 may be secured as shown in FIG. 11 by passing the opening 120 provided in the strap 118 over the end of the valve stem 16 followed by attachment of the wrench nut 80 as shown. This will provide a secure, yet economical field as well as manufacturing plant lifting ability which is safe in use and which will prevent damage to the protective coating applied to the valve housing 10.

Having described the invention, it will be apparent that various modifications may be made thereto without departing from the spirit and scope of this invention as defined in the appended claims.

What is claimed is:

1. A flow control device comprising:

a housing having a longitudinal axis and, at one portion, a through passage, a valve member mounted for movement in said housing relative to said passage to control flow through said passage, said housing having, at another portion, an opening receiving operating means for effecting movement of said valve member, said housing having, adjacent said opening, an internal lip which surrounds said longitudinal axis and an internal sealing surface adjacent said lip also surrounding said longitudinal axis and extending at an angle relative to said longitudinal axis, closing means for said opening, said closing means having a first peripheral surface for engaging said internal lip and a second peripheral portion supporting a resiliently compressible sealing member so as to sealingly engage said internal sealing surface when said closing means is positioned to close said opening; and wherein said closing means has aperture means for receiving and supporting said operating means for rotation relative to said aperture means about said longitudinal axis when installed in said opening, said closing means including a shoulder portion extending at least partially about said aperture means and extending from adjacent said first peripheral surface through and beyond said opening of said housing, when said closing means is positioned to close said opening, said shoulder portion having a peripheral external surface provided with spaced apart, radially projecting lug members, said closing means including a retaining ring having spaced apart radially inwardly projecting lug members, each for engaging a said lug member of said shoulder portion upon relative rotation between said retaining ring and said shoulder portion to thereby restrain axial movement of said closing means toward said opening.

2. The invention as claimed in claim 1, wherein said respective lugs members are 180° apart on said shoulder portion and on said retaining ring.

3. The invention as claimed in claim 2, wherein said retainer ring has a first annular surface facing said housing, said annular surface of said retaining ring having a radial dimension such that a portion of said first annular surface will contact at least a portion of said shoulder portion and said housing adjacent said opening.

4. The invention as claimed in claim 1, wherein said retaining ring is provided with an insulating coating.

5. The invention as claimed in claim 1, wherein said lug members of said shoulder portion and said retaining ring, each include complimentary sloping surfaces to facilitate interengagement between a said lug member of said retaining ring and a said lug member of said shoulder portion.

6. The invention as claimed in claim 1, wherein a portion of said shoulder portion and a portion of said retaining ring are shaped to provide a recess when said respective lug members are interengaged for receiving an adhesive material therebetween.

7. The invention as claimed in claim 1, wherein said aperture means includes, in axial alignment from one end of said closing means to the opposite end, a cavity having an interior threaded portion, a bore and a counter bore, a retainer bushing having an externally threaded surface for cooperation with said threaded portion of said cavity and a central bore, said operating means comprises a stem having a first portion insertable into said central bore of said retainer bushing, a collar for reception in said bore of said aperture means and a main portion extending from said collar through said counter bore to said valve member, said collar having a radial dimension greater than said central bore and said counter bore.

8. The invention as claimed in claim 7, wherein said retainer bushing is provided with a recess for facing said bore of said closing means for receiving a friction washer in said recess so as to engage said collar of said stem.

9. The invention as claimed in claim 8, wherein another friction washer is provided on a side of said collar opposite said side facing said recess of said retainer bushing.

10. The invention as claimed in claim 7, wherein said central bore of said retainer bushing and said first portion of said stem includes sealing means therebetween.

11. The invention as claimed in claim 7, wherein sealing means are provided between said main portion of said stem and said counter bore.

12. The invention as claimed in claim 7, wherein sealing means are provided between said cavity and said retaining bushing at a position spaced axially from said threaded interengagement.

13. The invention as claimed in claim 1, wherein said operating means is a threaded stem and said valve member is a plate member having one portion facing said opening of said housing and an opposite portion with opposite sides extending from said one portion to said opposite portion, said plate member carrying a connection member having an internally threaded bore, said one portion including retaining means for retaining said connection member against movement relative to said plate, said stem threadly engaging said connection member so that rotation of said stem will effect movement of said plate relative to said flow path.

14. The invention as claimed in claim 13, wherein said plate member is fully coated with an elastomeric material.

15. The invention as claimed in claim 13, wherein said plate member has a tubular axial opening for receiving said stem upon movement from a position where said plate member closes said flow path and a position where said plate is fully retracted from said flow path.

16. The invention as claimed in claim 13, wherein said plate member has a hollow tubular axial opening extending therethrough and said retaining means of said one portion of said plate member includes said connection member having an exterior flange engaged by arms located on opposite sides of said connection member.

17. The invention as claimed in claim 13 wherein said retaining means comprise a pair of arms and said pair of arms and said connection member including interengaging tabs and mating grooves.

18. The invention as claimed in claim 17, wherein said tab is formed on one of said arms and a mating groove is formed in a surface of said connection member.

19. The invention as claimed in claim 18, wherein the other of said arms is formed with a tab and another surface of said threaded member is also formed with a mating groove.

20. The invention as claimed in claim 1, wherein said flow path includes a seat for engaging said valve member to close said flow path, said valve member having a portion engaging said seat with said portion of said valve member being provided with cushioning means for absorbing compressive forces resulting from closing of said flow path by said valve member.

21. The invention as claimed in claim 1, wherein between said lip and said closing means a gap is provided, said gap being filled with an elastomeric sealing member to prevent the ingress of debris into said housing.

22. The invention as claimed in claim 1, wherein said housing has a valve seat adjacent said flow path and said valve member has a first portion for resiliently engaging said valve seat and a second portion spaced from said first portion for engaging another portion of said valve seat, said first portion having a reduced surface area compared to said second portion and with said second portion having a compressible covering to a depth less than that of said first portion of said valve member.

23. The invention as claimed in claim 22, wherein said second portion of said valve member includes spaced apart surfaces which are symmetrically located relative to said first portion on said valve member.

24. A flow control device comprising:

a housing having a longitudinal axis and, at one portion, a through passage, a valve member mounted for movement in said housing relative to said passage to control flow through said passage, said housing having, at another portion, an opening receiving operating means for effecting movement of said valve member, said housing having, adjacent said opening, an internal lip which surrounds said longitudinal axis and an internal sealing surface adjacent said lip also surrounding said longitudinal axis and extending at an angle relative to said longitudinal axis, closing means for said opening, said closing means having a first peripheral surface for engaging said internal lip and a second peripheral portion supporting a resiliently compressible sealing member so as to sealingly engage said internal sealing surface when said closing means is positioned to close said opening; wherein said operating means is a threaded stem and said valve member is a plate member having one portion facing said opening of said housing and an opposite portion with opposite sides extending from said one portion to said opposite portion, said plate member carrying a connection member having an internally threaded bore, said one portion including retaining means for retaining said connection member against movement relative to said plate, said stem threadly engaging said connection member so that rotation of said stem will effect movement of said plate relative to said flow path; wherein said retaining means comprise a pair of arms and said pair of arms and said connection member including interengaging tabs and mating grooves, said tab being formed on one of said arms and a mating groove is formed in a surface of said connection member, the other of said arms being formed with a tab and another surface of said threaded member being also formed with a mating groove.

25. The invention as claimed in claim 24, wherein said coverings are held in place on said opposite sides of said plate member by detent means.

* * * * *